(12) United States Patent
Jin et al.

(10) Patent No.: US 11,559,892 B2
(45) Date of Patent: Jan. 24, 2023

(54) SELF-PROPELLED TRAVELLING APPARATUS, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventors: Xiongfan Jin, Kanagawa (JP); Hideki Fujimoto, Kanagawa (JP); Tetsuya Kobayashi, Kanagawa (JP); Mariko Miyazaki, Kanagawa (JP); Hajime Kajiyama, Kanagawa (JP); Akira Ichikawa, Kanagawa (JP); Kunitoshi Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 269 days.

(21) Appl. No.: 16/538,843

(22) Filed: Aug. 13, 2019

(65) Prior Publication Data
US 2020/0055187 A1 Feb. 20, 2020

(30) Foreign Application Priority Data
Aug. 20, 2018 (JP) .............................. JP2018-154194

(51) Int. Cl.
*B25J 9/16* (2006.01)
*G06Q 10/08* (2012.01)
(Continued)

(52) U.S. Cl.
CPC ........... *B25J 9/1664* (2013.01); *B25J 11/008* (2013.01); *G06Q 10/0832* (2013.01); *G10L 15/26* (2013.01)

(58) Field of Classification Search
CPC ....... B25J 9/1664; B25J 11/008; G10L 15/26; G06Q 10/0832; G06Q 50/30;
(Continued)

(56) References Cited

U.S. PATENT DOCUMENTS 9,992,632 B2 6/2018 Fujimoto et al.
2007/0135962 A1 6/2007 Kawabe et al.
(Continued)

FOREIGN PATENT DOCUMENTS

| JP | 2004230479 | 8/2004 |
| JP | 2005339408 | 12/2005 |

(Continued)

OTHER PUBLICATIONS

JP-2010157018—English Translation (Year: 2010).*
"Office Action of Japan Counterpart Application", dated May 24, 2022, with English translation thereof, p. 1-p. 5.

*Primary Examiner* — Dale Moyer
(74) *Attorney, Agent, or Firm* — JCIPRNET

(57) ABSTRACT

A self-propelled travelling apparatus includes a travelling controller that controls travelling of the self-propelled travelling apparatus; a receiving unit that receives merchandise and a message associated with the merchandise from a user during travelling of the self-propelled travelling apparatus; and a supplying unit that supplies the message to another user in a case where the other user receives the merchandise while the self-propelled travelling apparatus is travelling after receiving the merchandise and the message.

14 Claims, 10 Drawing Sheets

(51) Int. Cl.
*G10L 15/26* (2006.01)
*B25J 11/00* (2006.01)

(58) Field of Classification Search
CPC .. G06Q 10/083; G06Q 10/02; G06Q 30/0251; G06Q 30/06; G06Q 30/0281; G06Q 30/0282; G05D 1/0221; G05D 1/0255
See application file for complete search history.

(56) References Cited

U.S. PATENT DOCUMENTS

| | | | | |
|---|---|---|---|---|
| 2015/0081480 | A1* | 3/2015 | Narita | G06Q 10/083 |
| | | | | 705/28 |
| 2016/0063435 | A1* | 3/2016 | Shah | G06Q 30/0633 |
| | | | | 705/44 |
| 2021/0241224 | A1* | 8/2021 | Taniguchi | G08G 1/00 |

FOREIGN PATENT DOCUMENTS

| | | | | |
|---|---|---|---|---|
| JP | 2007164379 | | 6/2007 | |
| JP | 2010157018 A | * | 7/2010 | |
| JP | 2017199168 | | 11/2017 | |
| WO | WO-03019425 A1 | * | 3/2003 | B65G 1/0435 |

* cited by examiner

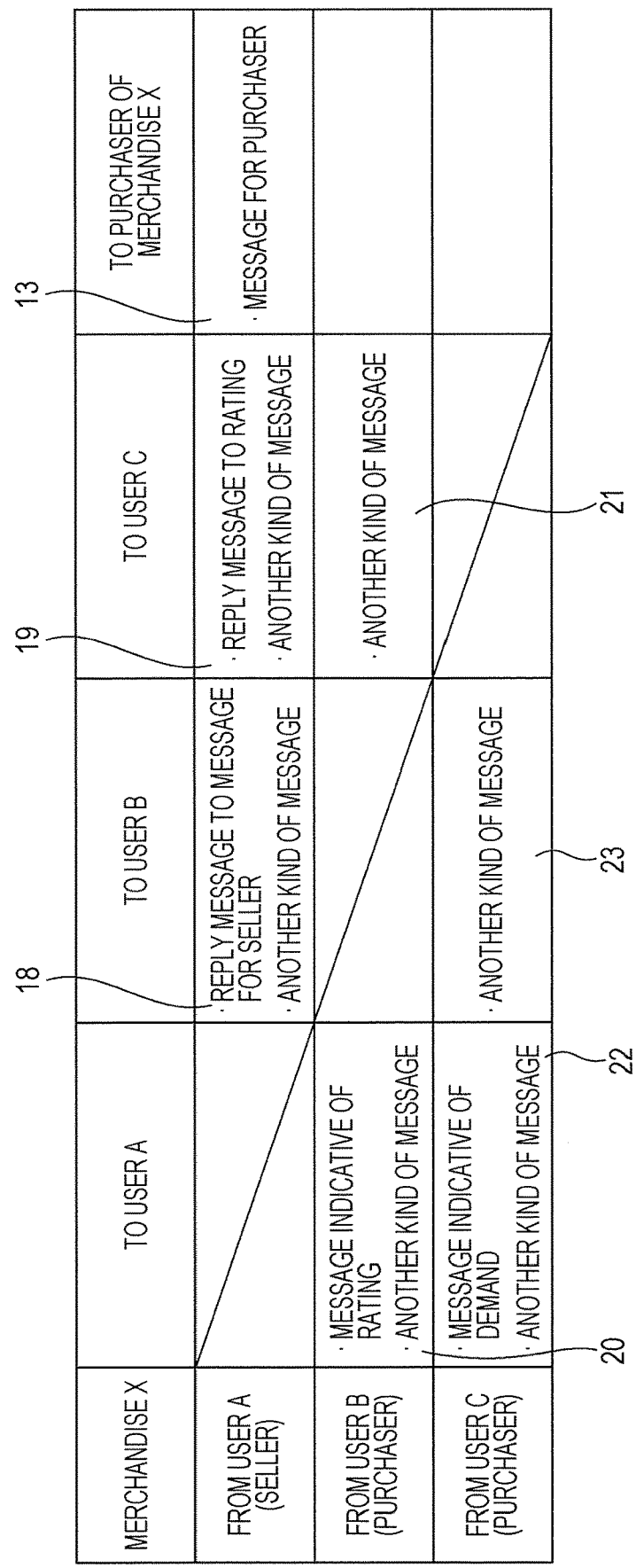

FIG. 6

| | TO USER A | TO USER B | TO USER C | TO USER D | TO PURCHASER OF MERCHANDISE X | TO PURCHASER OF MERCHANDISE Y |
|---|---|---|---|---|---|---|
| FROM USER A (MERCHANDISE X: SELLER) (MERCHANDISE Y: PURCHASER) | | (MERCHANDISE X) · MESSAGE FOR PURCHASER (MERCHANDISE Y) · MESSAGE FOR SELLER | (MERCHANDISE X) · REPLY MESSAGE TO MESSAGE FOR SELLER | | (MERCHANDISE X) · MESSAGE FOR PURCHASER | |
| | | (OTHER) · ANOTHER KIND OF MESSAGE | (OTHER) · ANOTHER KIND OF MESSAGE | (OTHER) · ANOTHER KIND OF MESSAGE | | |
| FROM USER B (MERCHANDISE X: PURCHASER) (MERCHANDISE Y: SELLER) | (MERCHANDISE X) · MESSAGE FOR SELLER (MERCHANDISE Y) · MESSAGE FOR PURCHASER | | | (MERCHANDISE Y) · REPLY MESSAGE TO MESSAGE FOR SELLER | | (MERCHANDISE Y) · MESSAGE FOR PURCHASER |
| | (OTHER) · ANOTHER KIND OF MESSAGE | | (OTHER) · ANOTHER KIND OF MESSAGE | (OTHER) · ANOTHER KIND OF MESSAGE | | |
| FROM USER C (MERCHANDISE X: PURCHASER) | (MERCHANDISE X) · MESSAGE INDICATIVE OF RATING | (MERCHANDISE Y) · MESSAGE INDICATIVE OF RATING | | (OTHER) · ANOTHER KIND OF MESSAGE | | |
| | (OTHER) · ANOTHER KIND OF MESSAGE | (OTHER) · ANOTHER KIND OF MESSAGE | | | | |
| FROM USER D (MERCHANDISE Y: PURCHASER) | (OTHER) · ANOTHER KIND OF MESSAGE | (OTHER) · ANOTHER KIND OF MESSAGE | (OTHER) · ANOTHER KIND OF MESSAGE | | | |

SELF-PROPELLED TRAVELLING APPARATUS, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-154194 filed Aug. 20, 2018.

BACKGROUND (i) Technical Field

The present disclosure relates to a self-propelled travelling apparatus, an information processing apparatus, and a non-transitory computer readable medium.

(ii) Related Art

For example, Japanese Unexamined Patent Application Publication No. 2017-199168 discloses a travelling apparatus that travels within a predetermined service providing area and provides service to a user present within the service providing area by travelling to the user upon receipt of a command to provide the service from the user. The travelling apparatus travels to a predetermined priority waiting place decided on the basis of a user's position among plural waiting places discretely or successively set within the service providing area and waits for a command to provide service.

SUMMARY

Merchandise is sometimes carried by using a self-propelled travelling apparatus. In this case, if a supplier of merchandise unilaterally supplies the merchandise, the merchandise can be delivered from one user to another, but a message associated with the merchandise is not given to the other user.

Aspects of non-limiting embodiments of the present disclosure relate to making it possible to deliver merchandise from one user to another user and give a message associated with the merchandise from the one user to the other user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a self-propelled travelling apparatus including: a travelling controller that controls travelling of the self-propelled travelling apparatus; a receiving unit that receives merchandise and a message associated with the merchandise from a user during travelling of the self-propelled travelling apparatus; and a supplying unit that supplies the message to another user in a case where the other user receives the merchandise while the self-propelled travelling apparatus is travelling after receiving the merchandise and the message.

BRIEF DESCRIPTION OF THE DRAWINGS

An exemplary embodiment of the present disclosure will be described in detail based on the following figures, wherein:

FIG. 5 illustrates another example of the management table;

FIG. 6 illustrates another example of the management table;

DETAILED DESCRIPTION

An exemplary embodiment of the present disclosure is described in detail below with reference to the attached drawings.

Hardware Configuration of Self-Propelled Travelling Apparatus

Figure 1:
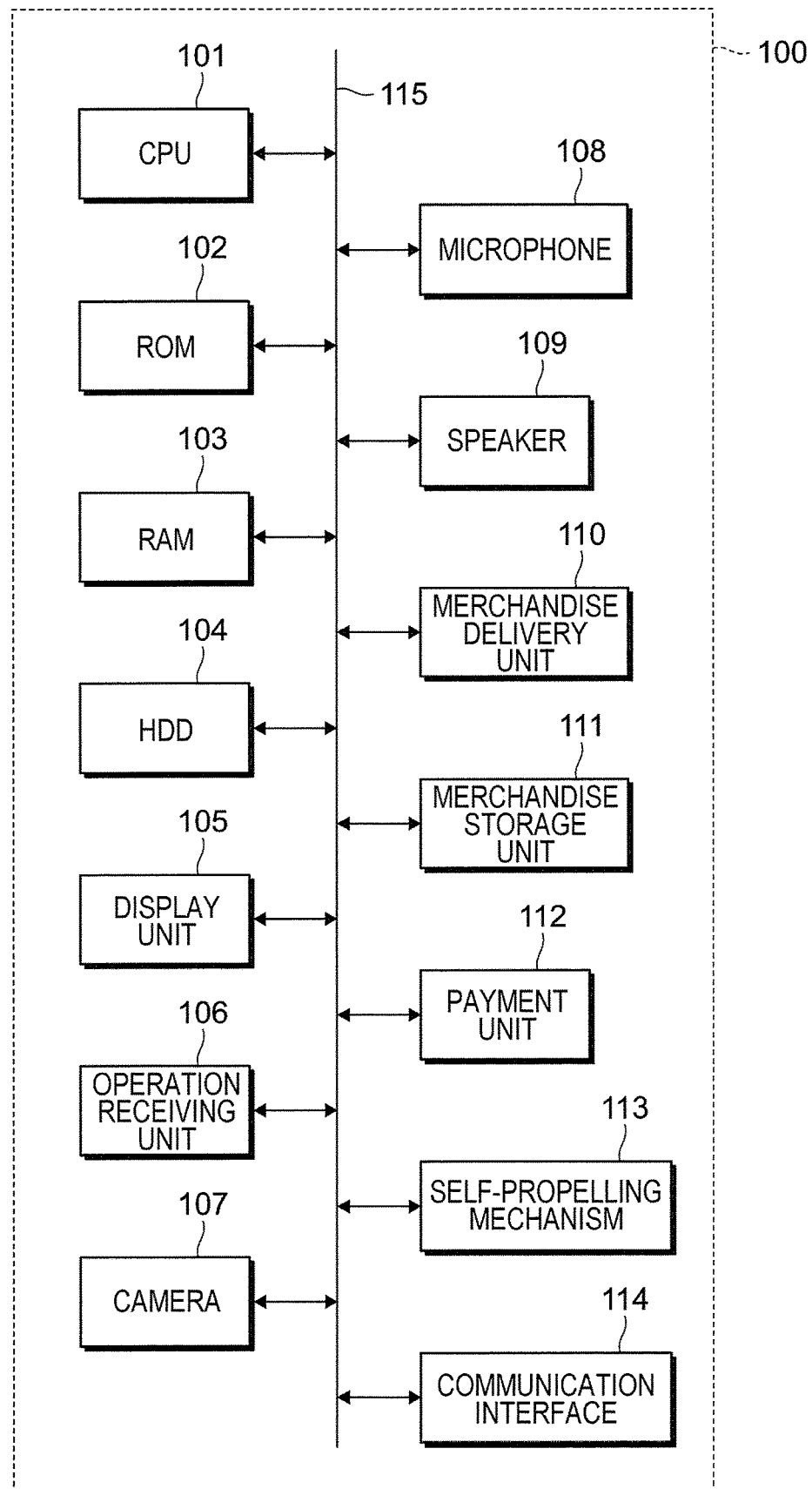
FIG. 1 illustrates an example of a hardware configuration of a self-propelled travelling apparatus according to the present exemplary embodiment.

FIG. 1 illustrates an example of a hardware configuration of a self-propelled travelling apparatus 100 according to the present exemplary embodiment. The self-propelled travelling apparatus 100 according to the present exemplary embodiment is an apparatus that delivers merchandise and a message from a user to another user. The self-propelled travelling apparatus 100 according to the present exemplary embodiment, for example, travels around along a predetermined route within a certain range such as an office or a community. The self-propelled travelling apparatus 100 relays delivery of merchandise such as merchandise possessed by a user or merchandise created by a user to another user and delivery of a message that is delivered in association with the merchandise from the user to the other user.

As illustrated in FIG. 1, the self-propelled travelling apparatus 100 according to the present exemplary embodiment includes a central processing unit (CPU) 101 that controls the whole apparatus through execution of a program (firmware), a read only memory (ROM) 102 in which a basic input output system (BIOS) and a program such as firmware are stored, and a random access memory (RAM) 103 used as a program execution region.

Furthermore, the self-propelled travelling apparatus 100 includes a hard disk drive (HDD) 104 that is a storage region in which an operating system (OS) and various kinds of programs such as an application, data input to the various kinds of programs, data output from the various kinds of programs, and the like are stored. In the HDD 104, for example, information on a message and merchandise received from a user (information on merchandise is hereinafter referred to as "merchandise information") is stored.

In the present exemplary embodiment, a configuration including the CPU 101, the ROM 102, the RAM 103, and the HDD 104 functions as an example of an information processing apparatus.

Furthermore, the self-propelled travelling apparatus 100 includes a display unit 105 that displays a user interface screen and the like, an operation receiving unit 106 that receives a user's operation on a touch panel or the like, a camera 107 that photographs surroundings of the self-propelled travelling apparatus 100, a microphone 108 that detects outer sound, and a speaker 109 that outputs sound to an outside.

In a case where a message or merchandise information received from a user is voice, the microphone 108 receives the message or merchandise information from the user. In a case where the message or merchandise information is not user's voice, for example, the operation receiving unit 106 receives the message or merchandise information from the user. Furthermore, the message or merchandise information is supplied to a user, for example, by being output from the speaker 109 as voice or by being displayed on the display unit 105.

In the present exemplary embodiment, the operation receiving unit 106 and the microphone 108 are used as examples of a receiving unit that receives a message. The display unit 105 and the speaker 109 are used as examples of a supplying unit and a notification unit.

Furthermore, the self-propelled travelling apparatus 100 includes a merchandise delivery unit 110 that receives merchandise from a user and hands over merchandise to a user, a merchandise storage unit 111 in which merchandise received from a user is stored, and a payment unit 112 that receives cash from a user and gives change to the user.

In the present exemplary embodiment, the merchandise delivery unit 110 is used as an example of a receiving unit that receives merchandise.

Furthermore, the self-propelled travelling apparatus 100 includes a self-propelling mechanism 113 that drives wheels (not illustrated) so as to allow the self-propelled travelling apparatus 100 to travel freely. The self-propelling mechanism 113 according to the present exemplary embodiment has a motor that drives the wheels and a steering mechanism that controls a direction of the wheels. The self-propelled travelling apparatus 100 travels forward or backward as a result of rotation of the wheels. A direction in which the self-propelled travelling apparatus 100 is switched by changing the direction of the wheels.

Furthermore, the self-propelled travelling apparatus 100 includes a communication interface (communication IF) 114 used for communication with an outside.

The aforementioned units are connected to one another through a bus 115 and exchange data through the bus 115.

Functional Configuration of Self-Propelled Travelling Apparatus

Figure 2:
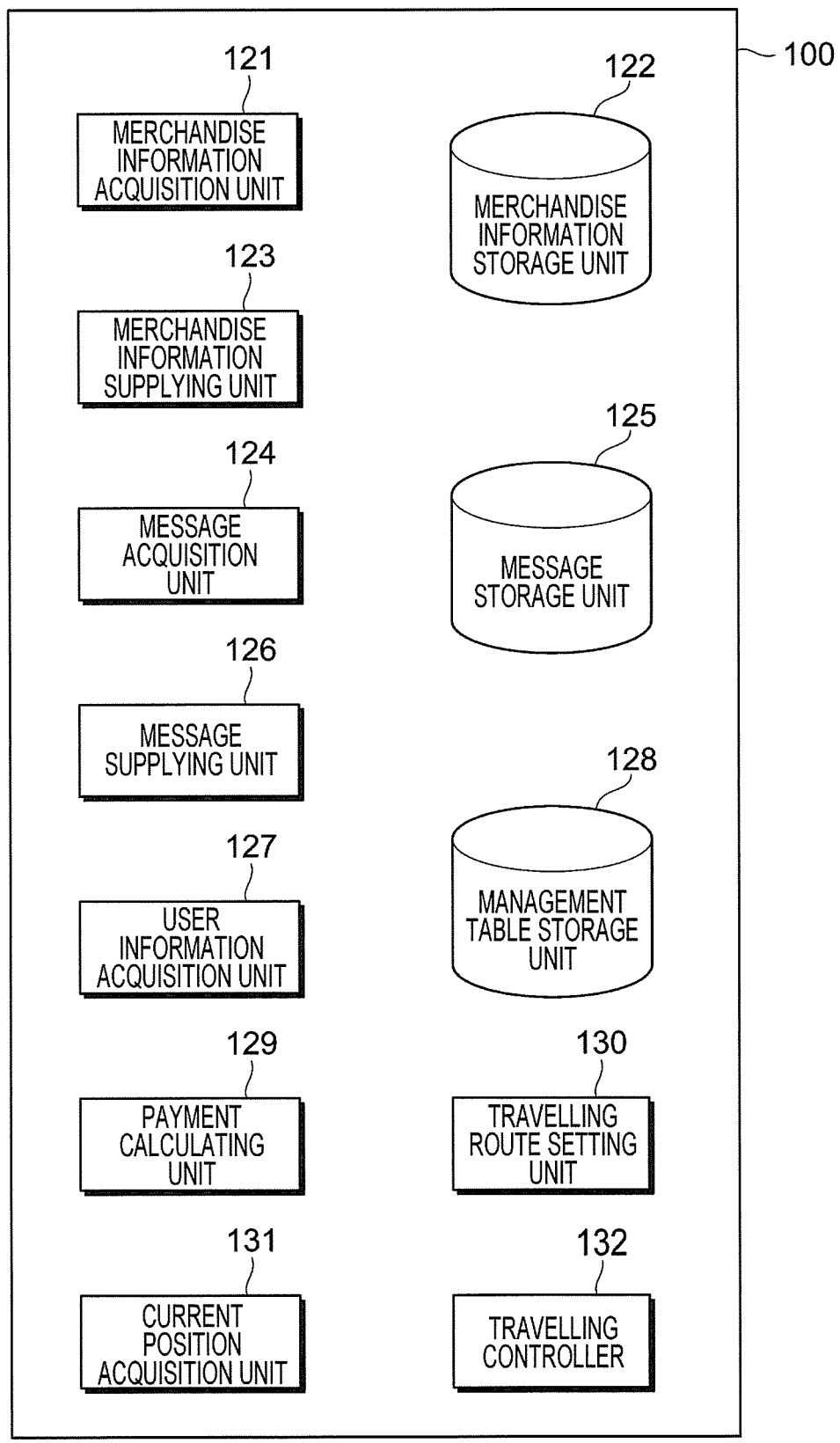
FIG. 2 is a block diagram illustrating an example of a functional configuration of the self-propelled travelling apparatus according to the present exemplary embodiment.

Next, a functional configuration of the self-propelled travelling apparatus 100 according to the present exemplary embodiment is described. FIG. 2 is a block diagram illustrating an example of a functional configuration of the self-propelled travelling apparatus 100 according to the present exemplary embodiment.

The self-propelled travelling apparatus 100 according to the present exemplary embodiment includes a merchandise information acquisition unit 121, a merchandise information storage unit 122, a merchandise information supplying unit 123, a message acquisition unit 124, a message storage unit 125, a message supplying unit 126, a user information acquisition unit 127, a management table storage unit 128, a payment calculating unit 129, a travelling route setting unit 130, a current position acquisition unit 131, and a travelling controller 132.

The merchandise information acquisition unit 121 acquires merchandise information on merchandise received from a user by the merchandise delivery unit 110, for example, through the microphone 108 or the operation receiving unit 106.

The merchandise information is, for example, a product name of the merchandise, a picture of the merchandise, features of the merchandise, information on a user who has supplied the merchandise, a rating from a person who has received the merchandise in the past, and the like. In a case where the merchandise is a food item, the merchandise information includes information such as a best-before date, necessity of refrigeration, and a cooking method.

In the present exemplary embodiment, the merchandise information acquisition unit 121 is used as an example of a unit that realizes a function of receiving merchandise.

The merchandise information storage unit 122 stores therein merchandise information acquired by the merchandise information acquisition unit 121.

The merchandise information supplying unit 123 supplies merchandise information stored in the merchandise information storage unit 122 to a user. For example, in a case where a user is present within a predetermined range from the self-propelled travelling apparatus 100, the merchandise information supplying unit 123 acquires merchandise information from the merchandise information storage unit 122 and supplies the acquired merchandise information to the user.

Note that whether or not a user is present within a predetermined range from the self-propelled travelling apparatus 100 is determined, for example, from an image of the user photographed by the camera 107 or by a sensor (not illustrated).

The message acquisition unit 124 acquires a message received from a user. Messages are classified into messages that are associated with merchandise and messages that are not associated with merchandise. A message that is associated with merchandise is, for example, a message from a person who has supplied merchandise to a person who receives the merchandise, and examples of such a message include explanation of merchandise or gratitude for receiving merchandise. Furthermore, a message that is associated with merchandise is, for example, a message from a person who has received the merchandise to a person who has supplied the merchandise, and examples of such a message include a message notifying a user about receipt of merchandise, a rating of merchandise, and an opinion on merchandise.

In the present exemplary embodiment, the message acquisition unit 124 is used as an example of a unit that realizes a function of receiving a message that is associated with merchandise.

The message storage unit 125 that is an example of a memory stores therein a message acquired by the message acquisition unit 124.

The message supplying unit 126 supplies a message stored in the message storage unit 125 to a user. In a case where the message is user's voice, the message is supplied to the user through the speaker 109. In a case where the message is not user's voice, the message is supplied to the user, for example, through the display unit 105.

Furthermore, the message supplying unit 126 supplies, to each user, a message according to the user. For example, the message supplying unit 126 supplies, to a person who receives merchandise, a message from a person who has supplied the merchandise. For example, the message supplying unit 126 supplies, to a person who has supplied merchandise, a message from a person who has received the merchandise.

In a case where the message supplying unit 126 supplies a message for a specific user, the message supplying unit 126 supplies the message after confirming that a user who receives the message is the specific user. Whether or not the user is the specific user is determined, for example, by comparing a photograph of a user registered in advance and an image of the user taken by the camera 107. Alternatively, whether or not the user is the specific user may be determined on the basis of voice collected from the user by the microphone 108 or may be determined on the basis of a user's operation on the operation receiving unit 106.

In the present exemplary embodiment, the message supplying unit 126 is used as an example of a unit that realizes a function of supplying a message.

The user information acquisition unit 127 acquires information on a person who has supplied merchandise and information on a person who has received the merchandise. In a case where the self-propelled travelling apparatus 100 receives merchandise, the user information acquisition unit 127 acquires information on a person who has supplied the merchandise, for example, on the basis of information entered by the person who has supplied the merchandise. Furthermore, in a case where a user receives merchandise, the user information acquisition unit 127 acquires information on the person who has received the merchandise, for example, on the basis of information entered by the person who has received the merchandise or photographing using the camera 107.

The management table storage unit 128 that is an example of a holding unit stores therein a management table in which a supplier of a message that is associated with merchandise and a receiver of the message are associated with each other. In the management table, information indicative of a supplier of merchandise or a receiver of merchandise is also associated with the supplier of the message and the receiver of the message.

Furthermore, upon receipt of information on a person who has supplied merchandise and information on a person who has received merchandise, the user information acquisition unit 127 registers, in the management table, information indicative of a person who has supplied merchandise and information indicative of a person who has received merchandise. Furthermore, upon receipt of a message, the message acquisition unit 124 registers the acquired message and registers information on a supplier of the message and information of a receiver of the message. Furthermore, in a case where the acquired message is associated with merchandise, the message acquisition unit 124 also registers information indicating that the message is associated with the merchandise. Details of the management table will be described later.

In the management table, information on a user who uses merchandise delivery service offered by the self-propelled travelling apparatus 100 is registered in advance. The information on the user is, for example, a name of the user, an address of a place where the user is present, a photograph of the user, and the like. In a case where a user who has not been registered in the management table stores merchandise in the self-propelled travelling apparatus 100 or receives merchandise from the self-propelled travelling apparatus 100, information on the user is newly registered in the management table.

In the present exemplary embodiment, the management table is used as an example of a correspondence between a supplier of a message and a receiver of the message.

The payment calculating unit 129 calculates payment in a case where merchandise is sold and purchased. For example, the payment calculating unit 129 calculates change by comparing a price of merchandise set by a seller who sells the merchandise and cash paid by a purchaser who purchases the merchandise.

The travelling route setting unit 130 sets a route along which the self-propelled travelling apparatus 100 travels. The travelling route of the self-propelled travelling apparatus 100 is decided in advance, for example, to travel around while passing a predetermined point within a certain range such as an office or a community, a place where a user registered as a person who uses the merchandise delivery service is present, and the like.

In a case where a request to deliver merchandise, a request to receive merchandise, or the like is given by a user while the self-propelled travelling apparatus 100 is travelling, the travelling route is updated. For example, in a case where a request to deliver merchandise has been given by a user, the travelling route setting unit 130 updates the predetermined travelling route so that the self-propelled travelling apparatus 100 stops by at a place where the user who has given the request is present.

The current position acquisition unit 131 detects a position of the self-propelled travelling apparatus 100 by receiving, for example, a radio wave from a global positioning system (GPS) satellite, a beacon emitted for indoor position measurement, or radio waves from plural access points.

The travelling controller 132 that is an example of a travelling controller controls travelling of the self-propelled travelling apparatus 100 by controlling the self-propelling mechanism 113 (see FIG. 1) on the basis of the current position of the self-propelled travelling apparatus 100 and information on the route that has been set. For example, the travelling controller 132 controls forward travelling, backward travelling, stopping, and a travelling direction of the self-propelled travelling apparatus 100. The travelling controller 132 controls the self-propelled travelling apparatus 100 so that the self-propelled travelling apparatus 100 travels around along the predetermined route.

The functional units that constitute the self-propelled travelling apparatus 100 are realized by cooperation of software and hardware resources. Specifically, for example, in a case where the self-propelled travelling apparatus 100 has the hardware configuration illustrated in FIG. 1, various programs stored, for example, in the HDD 104 are loaded into the RAM 103 and executed by the CPU 101, and thus the functional units such as the merchandise information acquisition unit 121, the merchandise information supplying unit 123, the message acquisition unit 124, the message supplying unit 126, the user information acquisition unit 127, the payment calculating unit 129, the travelling route setting unit 130, the current position acquisition unit 131, and the travelling controller 132 illustrated in FIG. 2 are realized. The merchandise information storage unit 122, the message storage unit 125, and the management table storage unit 128 are realized, for example, by the HDD 104.

Processing for Delivering Merchandise and Message

Figure 3:
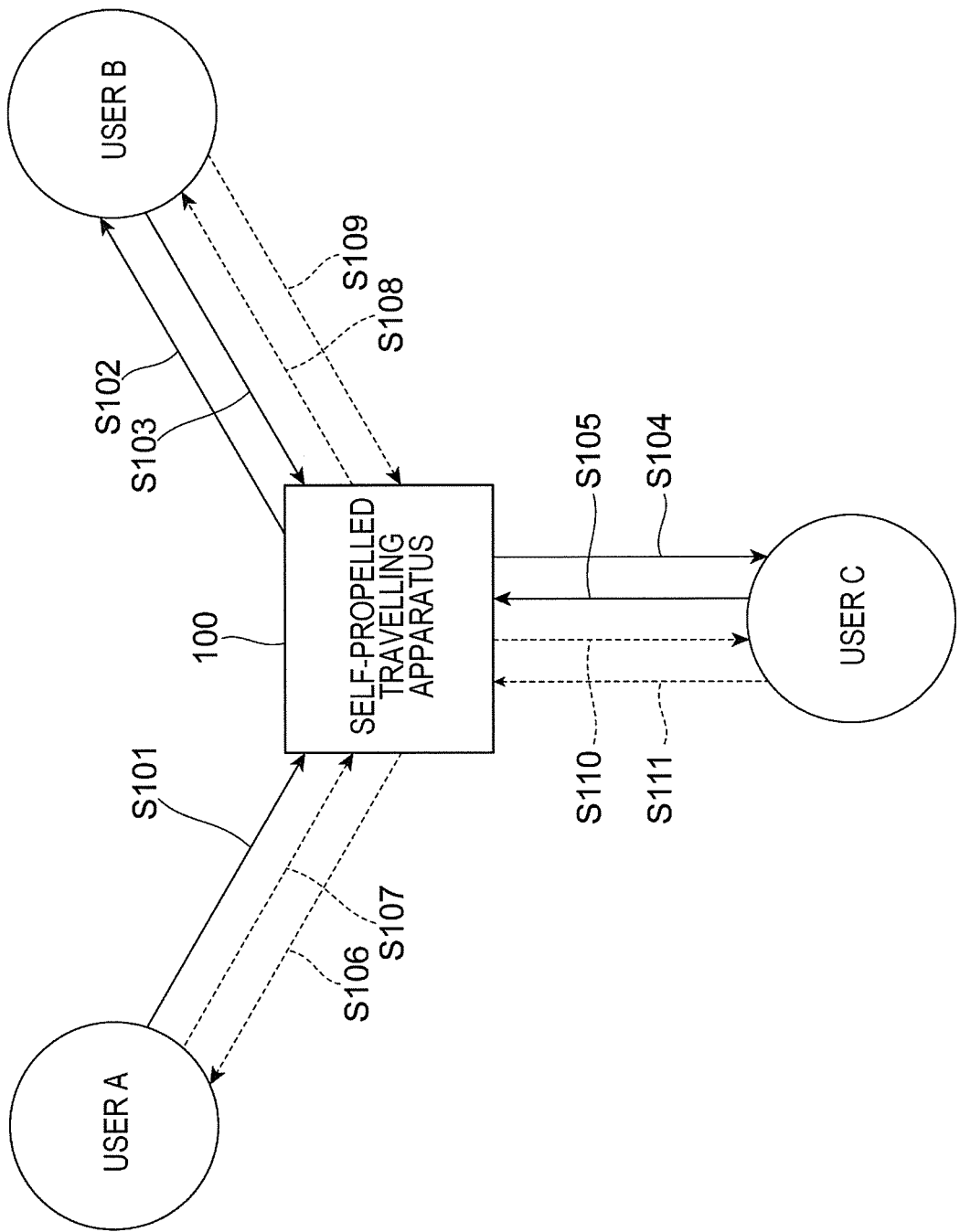
FIG. 3 is a view for explaining an example of processing for delivering merchandise and a message performed by the self-propelled travelling apparatus.

Next, processing for delivering merchandise and a message performed by the self-propelled travelling apparatus 100 is described. FIG. 3 is a view for explaining an example of processing for delivering merchandise and a message performed by the self-propelled travelling apparatus 100.

Hereinafter, a step of the processing is sometimes represented by a symbol "S".

In the example illustrated in FIG. 3, merchandise and messages are delivered among users A to C. Furthermore, the self-propelled travelling apparatus 100 travels around along a predetermined route so as to visit places where the users A to C are present. In FIG. 3, the solid line indicates processing in an earlier round of travelling, and the broken line indicates processing in a later round of travelling.

The present exemplary embodiment is not limited to an arrangement in which merchandise is sold as long as merchandise is delivered, but it is assumed in the example illustrated in FIG. 3 that the user A sells merchandise X. The user B is a purchaser who purchases the merchandise X, and the user C is a purchaser who purchased the merchandise X in the past.

First, the self-propelled travelling apparatus 100 receives the merchandise X and a message associated with the merchandise X from the user A (S101).

The user A stores the merchandise X in the merchandise storage unit 111 by using the merchandise delivery unit 110. Furthermore, the user A enters merchandise information of the merchandise X. For example, the user A enters a product name and a photograph of the merchandise X and enters a name and an address of the user A.

Furthermore, the user A enters a message associated with the merchandise X. For example, the user A enters a message such as explanation of the merchandise X and gratitude for purchasing the merchandise X as a message for a purchaser of the merchandise X.

Then, the merchandise information acquisition unit 121 acquires the merchandise information of the merchandise X and stores the acquired merchandise information in the merchandise information storage unit 122. Furthermore, the message acquisition unit 124 acquires the message received from the user A and stores the acquired message in the message storage unit 125. Furthermore, the message acquisition unit 124 registers, in the management table, information on the message. Furthermore, the user information acquisition unit 127 registers, in the management table, information indicating that the user A is a supplier (i.e., a seller) of the merchandise X.

The user A may designate the user B as a purchaser of the merchandise X but need not necessarily designate the user B as a purchaser of the merchandise X. In a case where the user A designates the user B as a purchaser of the merchandise X, a message for a purchaser of the merchandise X is registered in the management table as a message for the user B.

Furthermore, the user A enters a message for the user C as a message associated with the merchandise X. The user C is a past purchaser of the merchandise X. For example, the user A enters a message requesting a rating and feedback of the merchandise X or a reply message to a message for the seller entered by the user C when the user C purchased the merchandise X.

Furthermore, the user A may enter a message other than a message associated with the merchandise X. For example, the user A enters such a message for the user B or the user C. This message is also stored in the message storage unit 125. Furthermore, information on the message is registered in the management table.

Next, the self-propelled travelling apparatus 100 travels from a place where the user A is present to a place where the user B is present. Then, the self-propelled travelling apparatus 100 sells the merchandise X to the user B. In a case where the user B receives the merchandise X, the merchandise information supplying unit 123 supplies the merchandise information of the merchandise X to the user B. Furthermore, the message supplying unit 126 supplies the message from the user A to the user B (S102). In this example, a message for a purchaser of the merchandise X and another message that is not associated with the merchandise X are supplied to the user B.

In a case where the user B receives the merchandise X, the self-propelled travelling apparatus 100 receives a message associated with the merchandise X from the user B (S103). For example, the self-propelled travelling apparatus 100 receives, from the user B, a message such as a message indicating that the user B has purchased the merchandise X as a message for the user A who is a seller of the merchandise X. The user B may enter a message other than a message associated with the merchandise X.

Then, the message acquisition unit 124 acquires the message received from the user B and stores the acquired message in the message storage unit 125. Furthermore, the message acquisition unit 124 registers information on the message in the management table. Furthermore, the user information acquisition unit 127 registers, in the management table, information indicating that the user B is a receiver (i.e., a purchaser) of the merchandise X.

Next, the self-propelled travelling apparatus 100 travels from the place where the user B is present to a place where the user C is present. Then, the message supplying unit 126 supplies the message from the user A to the user C (S104). In this example, the message requesting a rating and feedback of the merchandise X and another message that is not associated with the merchandise X are supplied to the user C.

The self-propelled travelling apparatus 100 supplies the message to the user C after confirming that the user is the user C, for example, on the basis of a photograph of the user C registered in advance or a photograph taken by the camera 107 when the user C purchased the merchandise X in the past.

Furthermore, the self-propelled travelling apparatus 100 receives a message associated with the merchandise X from the user C (S105). For example, the self-propelled travelling apparatus 100 receives, from the user C, a message such as a message indicative of a rating of the merchandise X as a message for the user A.

Then, the message acquisition unit 124 acquires the message received from the user C and stores the acquired message in the message storage unit 125. Furthermore, the message acquisition unit 124 registers information on the message in the management table.

In this way, the self-propelled travelling apparatus 100 travels around so as to visit the users A to C and receives merchandise and a message and supplies the merchandise and the message. Furthermore, information in the management table is updated accordingly.

Figure 4:
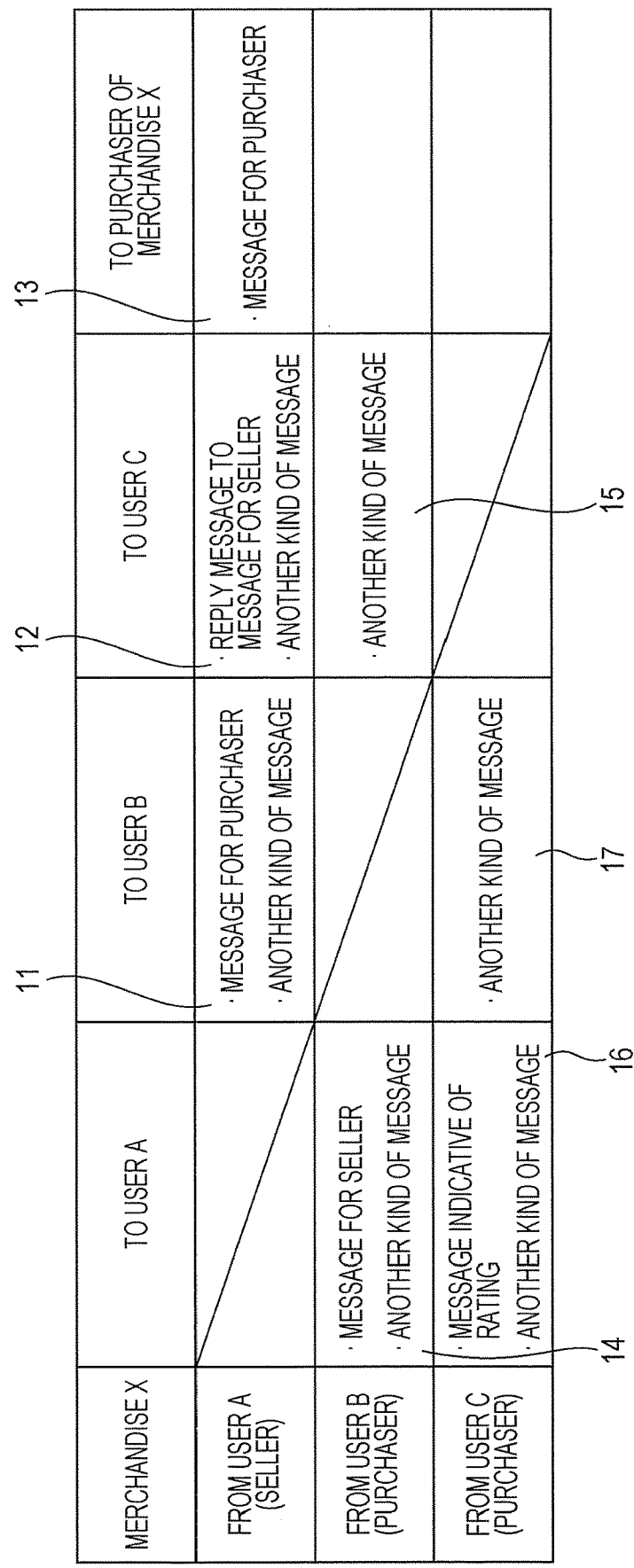
FIG. 4 illustrates an example of a management table.

FIG. 4 illustrates an example of the management table. FIG. 4 illustrates an example of the management table obtained after the places where the users A to C are present are visited and the processes in S101 to S105 are performed.

As illustrated in FIG. 4, in the management table, information on messages from each user to the other users is registered, and information indicative of a supplier of merchandise or a receiver of merchandise is associated with each user.

For example, a message for the user B, a message for the user C, and a message for a purchaser of the merchandise X are registered as for the user A. The message for a purchaser of the merchandise X is a message for a purchaser who will purchase the merchandise X. Similarly, a message for the user A and a message for the user C are registered as for the user B. Furthermore, a message for the user A and a message for the user B are registered as for the user C.

Furthermore, information indicating that the user A is a seller of the merchandise X and information indicating that the user B and the user C are purchasers of the merchandise X are registered.

More specifically, for example, messages 11 to 13 are messages registered in S101. The message 11 is supplied to the user B in S102, and the message 12 is supplied to the user C in S104. In a case where the user B is not designated as a purchaser of the merchandise X in S101, a "message for a purchaser" is registered as a message from the user A to the user B when the user B purchases the merchandise X.

The message 14 and the message 15 are, for example, messages registered in S103. The message 14 is supplied to the user A in S106 that will be described later, and the message 15 is supplied to the user C in S104.

Furthermore, the message 16 and the message 17 are, for example, messages registered in S105. The message 16 is supplied to the user A in S106 that will be described later, and the message 17 is supplied to the user B in S108 that will be described later.

In this way, merchandise and a message are received and the merchandise and the message are supplied, and the management table is updated accordingly.

After receiving the message from the user C, the self-propelled travelling apparatus 100 travels to the place where the user A is present and further travels around so as to visit the places where the users A to C are present.

When the self-propelled travelling apparatus 100 travels from the place where the user C is present to the place where the user A is present, the message supplying unit 126 supplies the messages from the user B and the user C to the user A (S106). In this example, the message received in S103 (e.g., a message indicating that the user B has purchased the merchandise X) is supplied as the message from the user B. Furthermore, the message received in S105 (e.g., a message indicative of a rating of the merchandise X) is supplied as the message from the user C.

Furthermore, the self-propelled travelling apparatus 100 receives a message associated with the merchandise X from the user A (S107). For example, the self-propelled travelling apparatus 100 receives a message such as a message requesting a rating and feedback of the merchandise X or a replay message to the message from the user B received in S103 as a message from the user A to the user B. Furthermore, the self-propelled travelling apparatus 100 receives a message such as a reply message to the message indicative of a rating received in S105 as a message from the user A to the user C.

Then, the message acquisition unit 124 acquires the messages received from the user A and stores the acquired messages in the message storage unit 125. Furthermore, the message acquisition unit 124 registers information on the messages in the management table.

The user A may newly store the merchandise X in the self-propelled travelling apparatus 100 in order to restock the self-propelled travelling apparatus 100 with the merchandise X.

Next, the self-propelled travelling apparatus 100 travels from the place where the user A is present to the place where the user B is present. Then, as in S102 and S103, the massage is supplied (S108) and a message is received (S109). In S108, the message from the user A received in S107 is supplied to the user B. Furthermore, in S109, a message such as a message indicative of a user's rating of the merchandise X is received as a message from the user B to the user A.

Next, the self-propelled travelling apparatus 100 travels from the place where the user B is present to the place where the user C is present. Then, as in S104 and S105, the message is supplied (S110) and a message is received (S111). In S110, the message from the user A received in S107 is supplied to the user C. In S111, a message such as a message indicative of a demand concerning the merchandise X is received as a message from the user C to the user A.

In S106 to S111, another kind of message that is not associated with the merchandise X may be received and supplied as in S101 to S105.

In this way, the self-propelled travelling apparatus 100 travels around so as to visit the places where the users A to C are present and receives and supplies messages. Furthermore, information in the management table is updated accordingly.

FIG. 5 illustrates another example of the management table. FIG. 5 illustrates an example of the management table obtained after the places where the users A to C are present are visited and the processes in S106 to S111 are performed.

The message 18 and the message 19 are, for example, the messages registered in S107. The message 18 is supplied to the user B in S108, and the message 19 is supplied to the user C in S110.

The message 20 and the message 21 are, for example, the messages registered in S109. The message 20 is supplied to the user A when the self-propelled travelling apparatus 100 visits the place where the user A is present next, and the message 21 is supplied to the user C in S110.

Furthermore, the message 22 and the message 23 are, for example, the messages registered in S111. The message 22 is supplied to the user A when the self-propelled travelling apparatus 100 visits the place where the user A is present next, and the message 23 is supplied to the user B when the self-propelled travelling apparatus 100 visits the place where the user B is present next.

The message 13 is not a message added in the processes in S106 to S111 but a message registered in S101.

In the management table, a message that has been already supplied to a receiver of the message may be left without being deleted. Furthermore, in the management table, information indicating whether or not a message has been already supplied to a receiver of the message may be registered for each message so that the message that has been already supplied is not supplied again to the receiver of the message.

Furthermore, in the management table, information indicating in which round of travelling counting from a round of travelling in which merchandise was received by the self-propelled travelling apparatus 100 a message associated with the merchandise was received may be associated with the message.

For example, in the example illustrated in FIG. 4, the message 11, which is a "message for a purchaser", is a message received when the self-propelled travelling apparatus 100 receives merchandise and starts travelling, and for example, information indicative of the first round of travelling is associated with the message 11. Furthermore, the message 14, which is a "message for a seller", is a message delivered from the user B to the user A in the first round of travelling after receipt of the merchandise by the self-propelled travelling apparatus 100, and for example, information indicative of the first round of travelling is associated with the message 14.

Furthermore, in the example illustrated in FIG. 5, the message 18, which is a "reply message to a message for a seller", is a message received when the self-propelled travelling apparatus 100 that received the merchandise returns to the place where the user A is present, and for example, information indicative of the second round of travelling is associated with the message 18. Furthermore, the message 20, which is a "message indicative of a rating", is a message received when the self-propelled travelling apparatus 100 that supplied the merchandise to the user B returns to the place where the user B is present, and for example, information indicative of the second round of travelling is associated with the message 20.

Furthermore, in the management table, information indicating how many times a message associated with merchandise has been exchanged may be associated with the message.

For example, in the example illustrated in FIG. 4, the message 11, which is a "message for a purchaser", is the first message delivered to a purchaser by the user A, and for example, information indicative of the first exchange is associated with the message 11. Furthermore, the message 14, which is a "message for a seller", is a message delivered from the user B to the user A after a "message for a purchaser" from the user A is supplied to the user B, and for example, information indicative of the second exchange is associated with the message 14.

For example, in the example illustrated in FIG. 5, the message 18, which is a "reply message to a message for a seller", is a message delivered from the user A to the user B after the "message for a seller" from the user B is supplied to the user A, and for example, information indicative of the third exchange is associated with the message 18. Furthermore, the message 20, which is a "message indicative of a rating", is a message delivered from the user B to the user A after the "reply message to the message for a seller" from the user A is supplied to the user B, and for example, information indicative of the fourth exchange is associated with the message 20.

Furthermore, in the self-propelled travelling apparatus 100, an item about which a message is to be received by the self-propelled travelling apparatus 100 may be decided in advance in accordance with the kind of merchandise. In a case where the self-propelled travelling apparatus 100 receives merchandise from a user, the self-propelled travelling apparatus 100 may the user a notification prompting the user to enter a message about an item corresponding to the kind of merchandise.

For example, in a case where the merchandise is a food item, items such as a best-before date and necessity of refrigerating are decided in advance as items of a message corresponding to a food item. For example, in a case where the merchandise is a toy, items such as an age and sex at which the toy is targeted are decided in advance as items of a message corresponding to a toy.

For example, in the example of FIG. 3, in a case where the merchandise X is a food item, the message acquisition unit 124 gives, upon receipt of user's entry indicating that the merchandise X is a food item, the user A a notification prompting the user A to enter a message about a best-before date and necessity of refrigerating of the merchandise X by using the display unit 105 or the speaker 109. More specifically, the notification is given to the user, for example, by displaying, on the display unit 105, a screen instructing the user to enter a message about an item corresponding to the kind of merchandise or by outputting voice instructing the user to enter a message about an item corresponding to the kind of merchandise from the speaker 109.

The same may apply to merchandise information. That is, an item about which merchandise information is received by the self-propelled travelling apparatus 100 is decided in advance in accordance with the kind of merchandise, and in a case where the self-propelled travelling apparatus 100 receives merchandise from a user, the self-propelled travelling apparatus 100 may give the user a notification prompting the user to enter merchandise information about an item corresponding to the kind of merchandise.

The self-propelled travelling apparatus 100 may receive, as a message associated with merchandise received from a user, a message according to a mode in which another user receives the merchandise.

For example, the self-propelled travelling apparatus 100 may receive, as a message according to a mode, a message given before another user receives merchandise and a message given after the other user receives the merchandise. For example, the self-propelled travelling apparatus 100 receives, as a message given before another user receives merchandise, a message such as introduction of the merchandise or explanation of the merchandise. Furthermore, for example, the self-propelled travelling apparatus 100 receives, as a message given after the other user receives the merchandise, a message such as gratitude for receipt of the merchandise or instructions for use.

For example, in the example of FIG. 3, the user A enters a message for a user who has not purchased the merchandise X yet and a message for a user who has purchased the merchandise X. Before the user B purchases the merchandise X, the message for a user who has not purchased the merchandise X yet is supplied to the user B. Meanwhile, after the user B purchases the merchandise X, the message for a user who has purchased the merchandise X is supplied to the user B.

Furthermore, for example, the self-propelled travelling apparatus 100 may receive, as a message according to a mode, a message corresponding to the number of pieces of merchandise or a quantity of merchandise received by another user. For example, the self-propelled travelling apparatus 100 receives, as a message given in a case where another user receives two or more pieces of merchandise, a message such as gratitude for receipt of the two or more pieces of merchandise or directions for use of the two or more pieces of merchandise in addition to a message given in a case where the other user receives only one piece of merchandise.

Furthermore, for example, the self-propelled travelling apparatus 100 may receive, as a message according to a mode, a message given in a case where another user has shown an intention to receive merchandise and a message given in a case where the other user is hesitating to receive the merchandise. For example, the self-propelled travelling apparatus 100 receives, as a message given in a case where another user has shown an intention to receive merchandise, a message such as gratitude for receipt of the merchandise or attention that should be paid when the merchandise is taken out from the self-propelled travelling apparatus 100. Furthermore, for example, the self-propelled travelling apparatus 100 receives, as a message given in a case where the other user is hesitating to receive the merchandise, a message such as a beneficial feature of the merchandise.

Whether another user has shown an intention to receive merchandise or is hesitating to receive the merchandise is determined, for example, on the basis of voice detected by the microphone 108 or a face expression photographed by the camera 107.

Another Example of Management Table

FIG. 6 illustrates another example of the management table. In the example illustrated in FIG. 6, merchandise and a message are exchanged among four users, i.e., the users A to D. As in the example illustrated in FIG. 4, the user A is a seller who sells the merchandise X, the user B is a purchaser who purchases the merchandise X, and the user C is a past purchaser who purchased the merchandise X in the past. Furthermore, in this example, merchandise Y is delivered. A seller who sells the merchandise Y is the user B. The user A is a purchaser who purchases the merchandise Y, and the user D is a past purchaser who purchased the merchandise Y in the past.

In this example, messages similar to those in the example illustrated in FIG. 4 are registered as messages associated with the merchandise X. Furthermore, messages associated with the merchandise Y are registered.

More specifically, as for the merchandise Y, a message for a purchaser is registered as a message from the user B to the user A. Furthermore, a reply message to a message for a seller is registered as a message from the user B to the user D. Furthermore, a message for a purchaser who will purchase the merchandise Y from the user B is registered. Furthermore, as for the merchandise Y, a message from the user A to the user B and a message from the user D to the user B are registered.

Furthermore, information indicating that the user A is a seller of the merchandise X and information indicating that the user B and the user C are purchasers of the merchandise X are registered. Furthermore, information indicating that the user B is a seller of the merchandise Y and information indicating that the user A and the user C are purchasers of the merchandise Y are registered.

In such a case where plural pieces of merchandise are delivered, information on messages for the other users are registered for each user and information indicative of a supplier of merchandise or a receiver of merchandise is associated with each user for each merchandise in the management table.

Processing Performed in Case where Merchandise is Received

Figure 7:
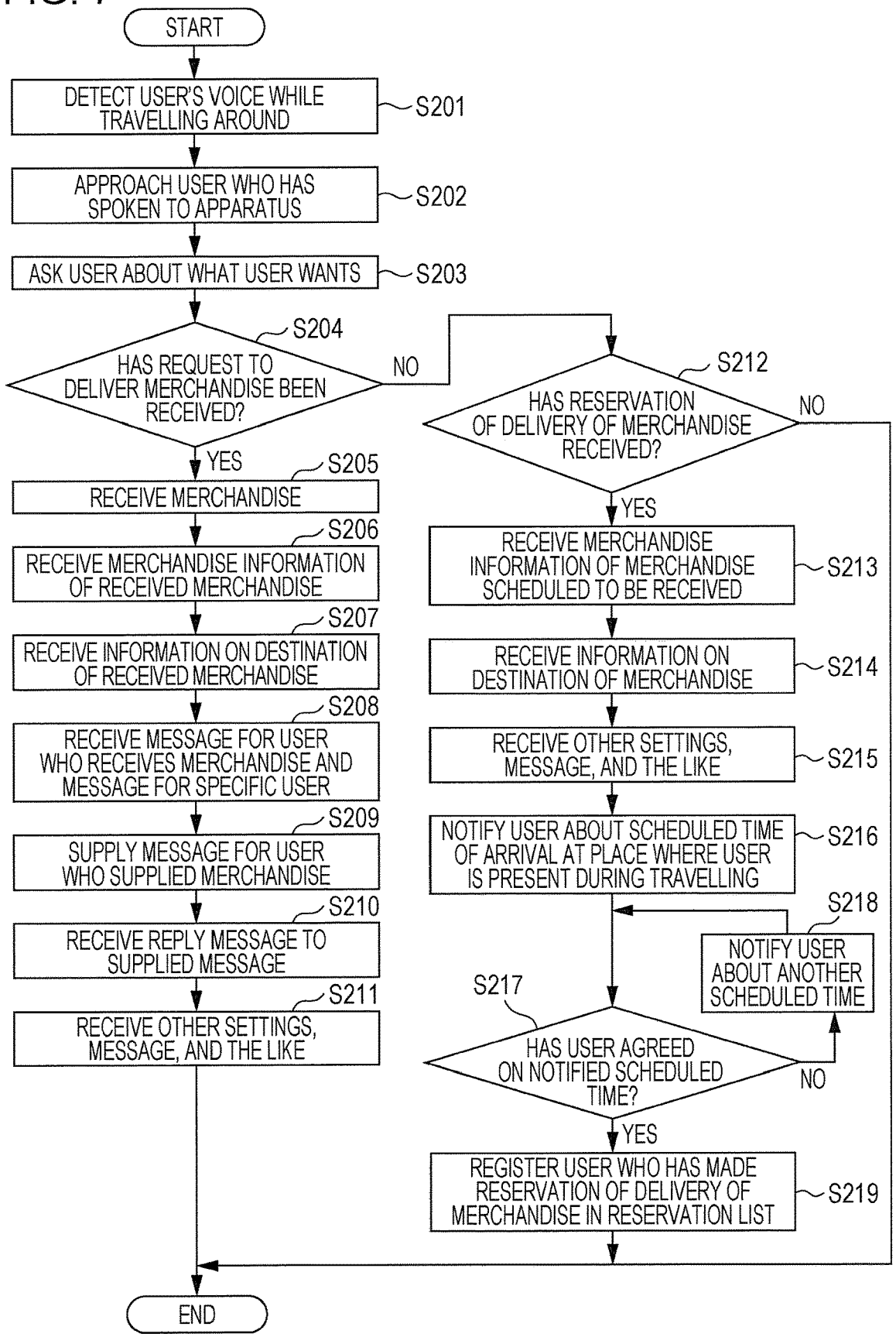
FIG. 7 is a flowchart illustrating an example of a procedure of processing performed in a case where the self-propelled travelling apparatus receives merchandise.

Next, processing performed in a case where the self-propelled travelling apparatus 100 receives merchandise is described by illustrating a procedure of the processing. FIG. 7 is a flowchart of an example of a procedure of the processing performed in a case where the self-propelled travelling apparatus 100 receives merchandise.

First, the self-propelled travelling apparatus 100 detects user's voice when the self-propelled travelling apparatus 100 is spoken to by a user while travelling around along a predetermined travelling route (S201). Next, the self-propelled travelling apparatus 100 approaches the user who has spoken to the self-propelled travelling apparatus 100 on the basis of the detected voice (S202). The self-propelled travelling apparatus 100 that has approached the user asks the user about what the user wants (S203). The self-propelled travelling apparatus 100 notifies the user that such a user's request will be received and then shifts to a state for receiving such a user's request.

Next, the self-propelled travelling apparatus 100 determines whether or not a request to deliver merchandise has been received (S204). In a case where a result of S204 is positive (Yes), S205 is performed. Meanwhile, in a case where the result of S204 is negative (No), the S212 is performed.

In a case where the result of S204 is positive (Yes), the self-propelled travelling apparatus 100 receives merchandise from the user (S205). Next, the self-propelled travelling apparatus 100 receives merchandise information of the received merchandise (S206). Next, the self-propelled travelling apparatus 100 receives information on a destination of the received merchandise (S207). The user need just enter information on a destination of the merchandise in a case where the user wants to designate a destination of the merchandise.

Next, the self-propelled travelling apparatus 100 receives a message for a user who receives the merchandise and a message for a specific user (S208). Next, the self-propelled travelling apparatus 100 supplies a message for a user who supplies merchandise to the user who has supplied the merchandise (S209). In this example, for example, a message from a purchaser of the merchandise is supplied. Next, the self-propelled travelling apparatus 100 receives a replay message to the message supplied in S209 (S210). Next, the self-propelled travelling apparatus 100 receives other settings, messages, and the like (S211). Then, this processing flow ends.

In a case where the result of S204 is negative (No), the self-propelled travelling apparatus 100 determines whether or not a reservation of delivery of merchandise has been received from the user (S212). In this step, the self-propelled travelling apparatus 100 inquires, of the user, whether or not the user wants to make a reservation of delivery of merchandise. More specifically, for example, the self-propelled travelling apparatus 100 notifies the user that a reservation will be received and displays a screen for receiving a reservation.

In a case where a result of S212 is negative (No), this processing flow ends.

In a case where the result of S212 is positive (Yes), the self-propelled travelling apparatus 100 receives merchandise information of the merchandise to be received (S213). Next, the self-propelled travelling apparatus 100 receives information on a destination of the merchandise (S214). Next, the self-propelled travelling apparatus 100 receives other settings, messages, and the like (S215).

Next, the self-propelled travelling apparatus 100 notifies the user who has made a reservation of delivery of the merchandise about a scheduled time at which the travelling self-propelled travelling apparatus 100 that is travelling around will arrive at a place where the user is present (S216). Next, the self-propelled travelling apparatus 100 determines whether or not the user has agreed on the scheduled time (S217). In this step, the self-propelled travelling apparatus 100 inquires, of the user, whether the scheduled time is acceptable. More specifically, for example, the self-propelled travelling apparatus 100 displays a screen for receiving selection as to whether arrival at the scheduled time is acceptable.

In a case where a result of S217 is negative (No), the self-propelled travelling apparatus 100 notifies the user about a different scheduled time (S218) and shifts to S217.

Meanwhile, in a case where the result of S217 is positive (Yes), the self-propelled travelling apparatus 100 registers, in a reservation list, the user who has made a reservation of delivery of the merchandise (S219). In this reservation list, a name and an address of the user who has made a reservation of delivery of the merchandise, the merchandise information received in S213, the information on a destination received in S214, the scheduled time of arrival at the place where the user is present, and the like are registered for each reservation of delivery of merchandise. Then, this processing flow ends.

Figure 8:
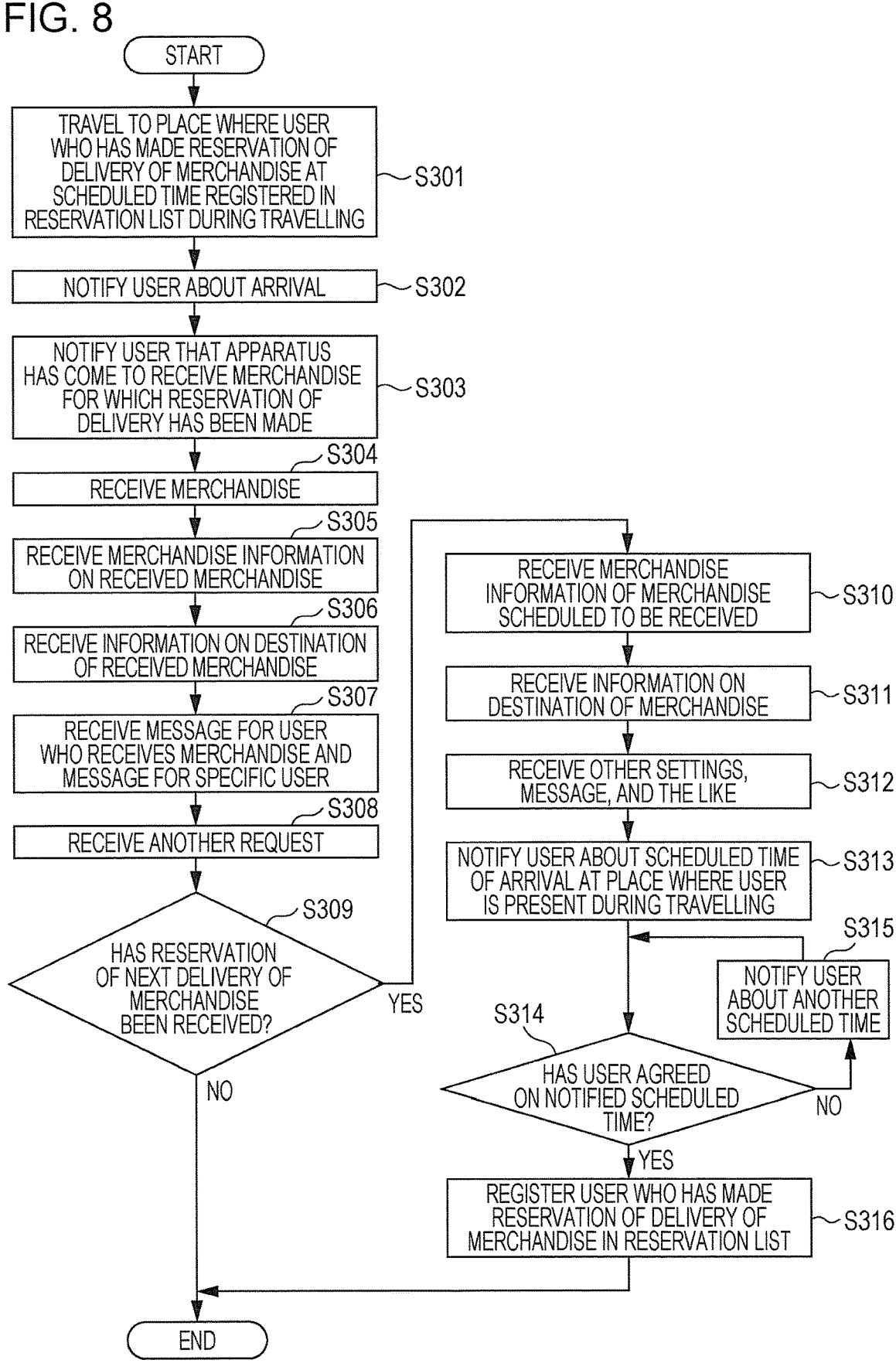
FIG. 8 is a flowchart illustrating an example of a procedure of processing performed in a case where the self-propelled travelling apparatus receives merchandise from a user who has made a reservation.

Processing Performed in Case where Merchandise is Received from User Who has Made Reservation Next, processing performed in a case where the self-propelled travelling apparatus 100 receives merchandise from a user who has made a reservation is described by illustrating a procedure of the processing. FIG. 8 is a flowchart of an example of a procedure of the processing performed in a case where the self-propelled travelling apparatus 100 receives merchandise from a user who has made a reservation.

The self-propelled travelling apparatus 100, which is travelling around along a predetermined travelling route, travels to a place where a user who has made a reservation of delivery of merchandise at a scheduled time registered in the reservation list (S301). The self-propelled travelling apparatus 100 that has arrived at the place where the user who has made a reservation of delivery of merchandise notifies the user about arrival by using the speaker 109 (S302). Next, the self-propelled travelling apparatus 100 notifies the user that the self-propelled travelling apparatus 100 has come to receive the merchandise for which the reservation of delivery has been made (S303).

Next, the self-propelled travelling apparatus 100 receives the merchandise from the user (S304). Next, the self-propelled travelling apparatus 100 receives merchandise information of the received merchandise (S305). Next, the self-propelled travelling apparatus 100 receives information on a destination of the received merchandise (S306). The user need just enter information on a destination in a case where the user wants to designate a destination of the merchandise. Next, the self-propelled travelling apparatus 100 receives a message for a user who receives the merchandise and a message for a specific user (S307).

Next, the self-propelled travelling apparatus 100 receives another request (S308). In this step, the self-propelled travelling apparatus 100 notifies the user that another request will be received and shifts to a state for receiving another request. Next, the self-propelled travelling apparatus 100 determines whether or not a reservation of next delivery of merchandise has been received (S309). In this step, the self-propelled travelling apparatus 100 inquires, of the user, whether or not the user wants to make a reservation of next delivery of merchandise. More specifically, for example, the self-propelled travelling apparatus 100 notifies the user that a reservation of next delivery will be received and displays a screen for receiving a reservation.

In a case where a result of S309 is negative (No), this processing flow ends.

In a case where the result of S309 is positive (Yes), processes in S310 to S316 are performed. The processes in S310 to S316 are identical to the processes in S213 to S219 of FIG. 7, and therefore description thereof is omitted.

Processing Performed in Case where Merchandise is Handed Over

Figure 9:
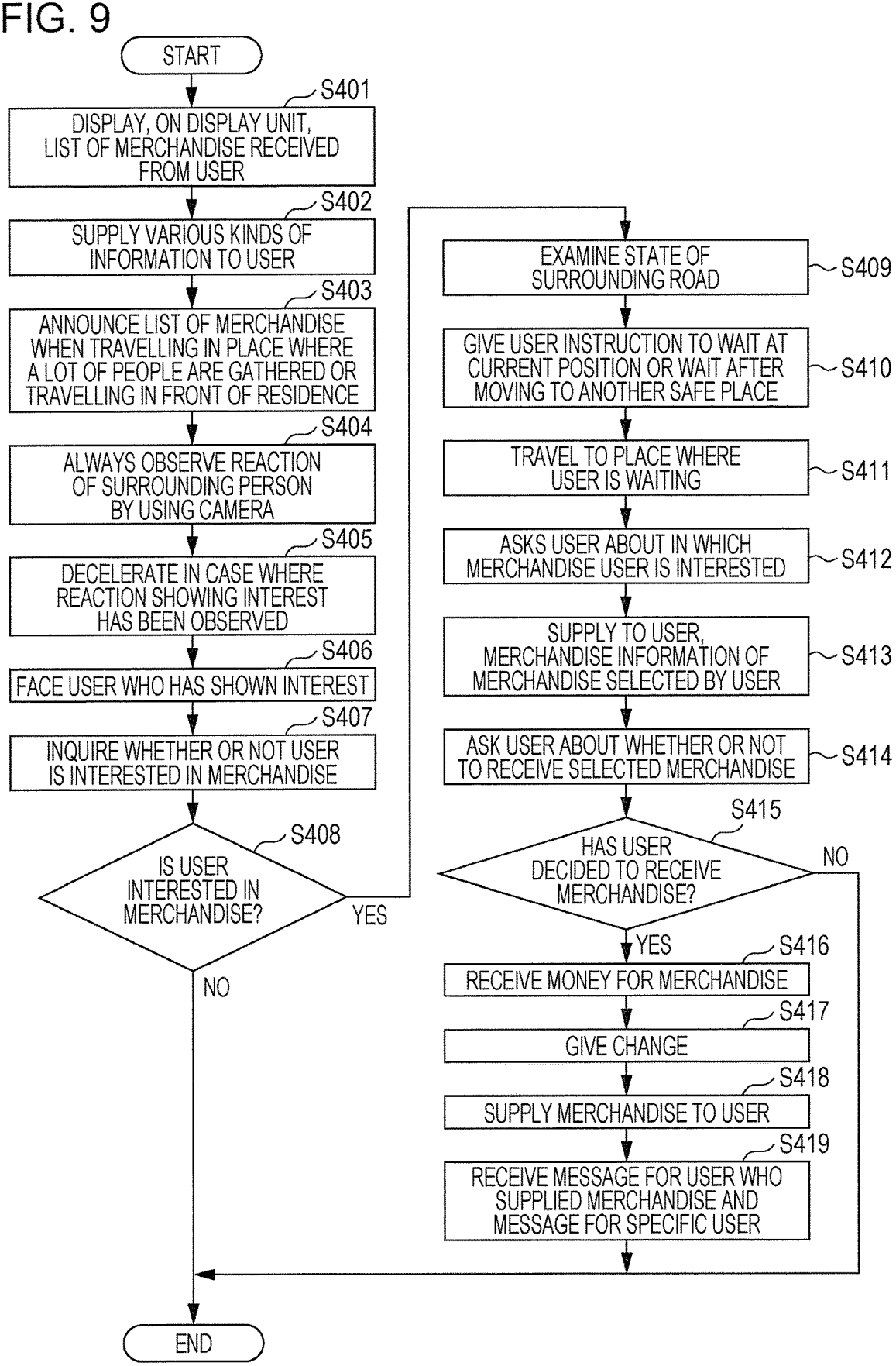
FIG. 9 is a flowchart illustrating an example of a procedure of processing performed in a case where the self-propelled travelling apparatus hands over merchandise.
Figure 10:
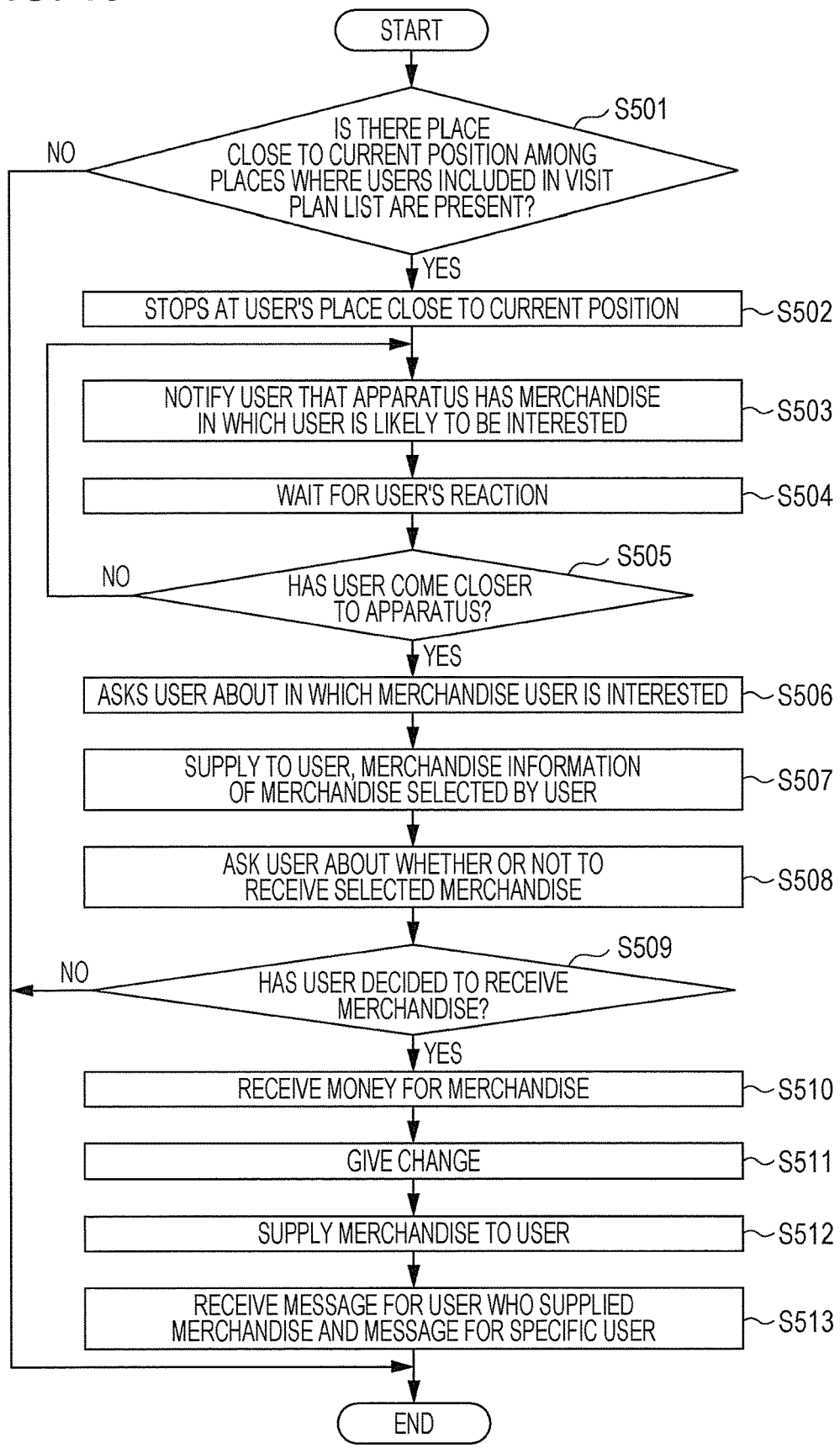
FIG. 10 is a flowchart illustrating an example of a procedure of processing performed in a case where the self-propelled travelling apparatus hands over merchandise.

Next, processing performed in a case where the self-propelled travelling apparatus 100 hands over merchandise is described by illustrating a procedure of the processing. FIGS. 9 and 10 are flowcharts of an example of a procedure of the processing performed in a case where the self-propelled travelling apparatus 100 hands over merchandise. The self-propelled travelling apparatus 100 performs both of the processing of FIG. 9 and the processing of FIG. 10 while travelling.

First, a procedure of the processing illustrated in FIG. 9 is described.

In the example illustrated in FIG. 9, a user who receives merchandise is not decided in advance. For example, this case corresponds to a case where the user A does not designate the user B as a purchaser of the merchandise X and the user B has purchased the merchandise X from the self-propelled travelling apparatus 100 in the example illustrated in FIG. 3.

The self-propelled travelling apparatus 100 causes a list of merchandise received from users to be displayed on the display unit 105 (S401). For example, the self-propelled travelling apparatus 100 always displays the list of merchandise after starting travelling. Furthermore, the self-propelled travelling apparatus 100 supplies, to a user, for example, by an e-mail, various kinds of information such as a list of merchandise received from users, a travelling route of the self-propelled travelling apparatus 100 set by the travelling route setting unit 130, and a scheduled time of arrival at a predetermined point on the travelling route (S402). For example, the self-propelled travelling apparatus 100 regularly supplies the various kinds of information after starting travelling. Furthermore, for example, the self-propelled travelling apparatus 100 supplies the various kinds of information to a user who has been already registered as a person using the merchandise delivery service offered by the self-propelled travelling apparatus 100.

The self-propelled travelling apparatus 100 announces the list of merchandise by using the speaker 109 when travelling in a place where a lot of people are gathered or travelling in front of a residence (S403). Note that it is determined that the self-propelled travelling apparatus 100 is travelling in a place where a lot of people are gathered or travelling in front of a residence, for example, by photographing surroundings by using the camera 107. Furthermore, the self-propelled travelling apparatus 100 always observes reaction of a person around the self-propelled travelling apparatus 100 by using the camera 107 (S404). The self-propelled travelling apparatus 100 decelerates in a case where reaction showing interest has been observed (S405). The reaction showing interest is reaction such as a case where a person stops to watch the self-propelled travelling apparatus 100 or a case where a person is moving toward the self-propelled travelling apparatus 100.

Next, the self-propelled travelling apparatus 100 faces a user who has shown interest (S406). Next, the self-propelled travelling apparatus 100 inquires, of the user, whether or not the user is interested in merchandise by using the speaker 109 (S407). Next, the self-propelled travelling apparatus 100 determines whether or not the user is interested in merchandise (S408). For example, in a case where the user continues to watch the self-propelled travelling apparatus 100 or in a case where the user is moving toward the self-propelled travelling apparatus 100, the self-propelled travelling apparatus 100 determines that the user is interested in merchandise (Yes in S408). Meanwhile, for example, in a case where the user removes his or her gaze from the self-propelled travelling apparatus 100 or in a case where the user has moved in a direction different from a direction toward the self-propelled travelling apparatus 100, the self-propelled travelling apparatus 100 determines that the user is not interested in merchandise (No in S408). Alternatively, the self-propelled travelling apparatus 100 may determine whether or not the user is interested in merchandise on the basis of user's voice.

In a case where a result of S408 is negative (No), this processing flow ends.

In a case where the result of S408 is positive (Yes), the self-propelled travelling apparatus 100 examines a state of a road around the self-propelled travelling apparatus 100 (S409). For example, the self-propelled travelling apparatus 100 grasps a state of the road by photographing surroundings by using the camera 107. Next, the self-propelled travelling apparatus 100 gives the user an instruction to wait at a current position or wait after moving to another safe place by using the speaker 109 (S410). For example, the self-propelled travelling apparatus 100 examines a state of a road around the self-propelled travelling apparatus 100, and in a case where a lot of cars are travelling on the road on which the user is present, the self-propelled travelling apparatus 100 instructs the user to wait after moving to another safe place. Meanwhile, in a case where there is no car travelling on the road on which the user is present, the self-propelled travelling apparatus 100 instructs the user to wait at the current position.

Next, the self-propelled travelling apparatus 100 travels to the place where the user is waiting (S411). Next, the self-propelled travelling apparatus 100 displays the list of merchandise and asks the user about in which merchandise the user is interested (S412). Next, the self-propelled travelling apparatus 100 supplies, to the user, merchandise information of merchandise selected by the user (S413). Next, the self-propelled travelling apparatus 100 asks the user about whether or not to receive the selected merchandise (S414). For example, the self-propelled travelling apparatus 100 displays a screen for receiving selection as to whether or not to receive the merchandise.

Next, the self-propelled travelling apparatus 100 determines whether or not the user has decided to receive the merchandise (S415). In a case where a result of S415 is negative (No), this processing flow ends. Meanwhile, in a case where the result of S415 is positive (Yes), the self-propelled travelling apparatus 100 receives money for the merchandise from the user (S416). Next, the self-propelled travelling apparatus 100 gives change to the user (S417). In a case where the merchandise is received for free, the processes in S416 and 417 are not performed.

Next, the self-propelled travelling apparatus 100 supplies the merchandise to the user (S418). In this step, a message for the user is also supplied. Next, the self-propelled travelling apparatus 100 receives a message for a user who supplied the merchandise (e.g., a seller of the merchandise) and a message for a specific user (S419). Then, this processing flow ends.

Next, a procedure of the processing illustrated in FIG. 10 is described.

In the example illustrated in FIG. 10, a user who receives merchandise is decided in advance. For example, this case corresponds to a case where the user A designates the user B as a purchaser of the merchandise X or a case where the user C who is a past purchaser of the merchandise X is present in the example illustrated in FIG. 3. Furthermore, for example, this case corresponds to a case where there is a user who has made a reservation of receiving merchandise or a case where there is a user who has registered merchandise as a thing which the user wants.

The self-propelled travelling apparatus 100, which is travelling around along a predetermined route, determines whether or not there is a place close to a current position among places where users included in a visit plan list are present (S501). For example, the self-propelled travelling apparatus 100 determines whether or not there is a place within a predetermined range (e.g., within 100 meters) from the current position among the places where the users included in the visit plan list are present.

The visit plan list is a list of users which the self-propelled travelling apparatus 100 is scheduled to visit. Examples of the users which the self-propelled travelling apparatus 100 is scheduled to visit include a user designated as a receiver by a supplier of merchandise, a user who received merchandise in the past, a user who has made a reservation of receiving merchandise, and a user who has registered merchandise as a thing which the user wants.

In a case where a result of S501 is negative (No), this processing flow ends.

In a case where the result of S501 is positive (Yes), the self-propelled travelling apparatus 100 stops at a user's place close to the current position (S502). Next, the self-propelled travelling apparatus 100 notifies the user that the self-propelled travelling apparatus 100 has merchandise in which the user is likely to be interested by using the speaker 109 (S503). Next, the self-propelled travelling apparatus 100 waits for user's reaction (S504). Next, the self-propelled travelling apparatus 100 determines whether or not the user has come closer to the self-propelled travelling apparatus 100 (S505).

In a case where a result of S505 is negative (No), S503 is performed. In a case where the user does not come closer to the self-propelled travelling apparatus 100 even after elapse of a predetermined period, the self-propelled travelling apparatus 100 may resume travelling.

In a case where the result of S505 is positive (Yes), processes in S506 to S513 are performed. The processes in S506 to S513 are identical to the processes in S412 to S419 in FIG. 9, and therefore description thereof is omitted.

In a case where merchandise has properties that require that the merchandise should be handed over to a user early, the self-propelled travelling apparatus 100 may notify, by an e-mail for example, the user who has made a reservation of receiving the merchandise about information such as a scheduled time of arrival at a place where the user is present and whether or not the self-propelled travelling apparatus 100 can arrive by a deadline of handover of the merchandise. Furthermore, for example, the self-propelled travelling apparatus 100 may ask for permission of arrival at a time later than a scheduled time from a user who has made a reservation of receiving another merchandise, and in a case where the self-propelled travelling apparatus 100 gets the permission, the self-propelled travelling apparatus 100 may make adjustment so that the self-propelled travelling apparatus 100 postpones receipt of this merchandise and preferentially visit a place where a user who has made a reservation of receiving the merchandise that need be handed over early. The merchandise that need be handed over to a user early is, for example, a food item that need be refrigerated and has a short expiration period.

As described above, the self-propelled travelling apparatus 100 according to the present exemplary embodiment receives merchandise and a message associated with the merchandise from a user. In a case where another user receives the merchandise, the message associated with the merchandise is supplied to the other user. A message received by the self-propelled travelling apparatus 100 is managed in the management table, and a supplier and a receiver of the message are associated with the message. Furthermore, information indicative of a supplier of merchandise or a receiver of merchandise is associated with each user who is a supplier or a receiver of a message.

Although the self-propelled travelling apparatus 100 travels around along a predetermined route in the present exemplary embodiment, the present exemplary embodiment is not limited to such an arrangement. The self-propelled travelling apparatus 100 may travel along any route, provided that the self-propelled travelling apparatus 100 travels from a place where a user is present to a place where another user is present, delivers merchandise from the user to the other user, and supplies a message from the user to the other user.

A program for realizing the exemplary embodiment of the present disclosure may be supplied by a means of communication or may be supplied by being stored in a recording medium such as a CD-ROM.

Although the various exemplary embodiments and modifications have been described above, these exemplary embodiments and modifications may be combined.

The present disclosure is not limited to the above exemplary embodiment and can be modified in various ways without departing from the spirit of the present disclosure.

The foregoing description of the exemplary embodiment of the present disclosure has been supplied for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A self-propelled travelling apparatus comprising:
a merchandise storage space that stores a merchandise placed by a first user present at a first place; and
a processor, configured to:
control travelling of the self-propelled travelling apparatus from the first place at which the first user is present to a second place at which a second user is present;
receive a message associated with the merchandise from the first user during traveling of the self-propelled travelling apparatus;
in a case where the second user receives the merchandise, supply the message associated with the merchandise to the second user; and
in a case where the merchandise and the message associated with the merchandise are supplied to the second user, the processor receives a message not associated with the merchandise for the first user from the second user.

2. The self-propelled travelling apparatus according to claim 1, wherein
the processor controls the self-propelled travelling apparatus to travel to the second place where second user is present after receiving the message associated with the merchandise for the second user from the first user;
the processor supplies the message associated with the merchandise for the second user from the first user; and
the processor receives the message not associated with the merchandise for the first user from the second user.

3. The self-propelled travelling apparatus according to claim 2, wherein
the processor further controls the self-propelled travelling apparatus to travel from the second place where the second user is present to a third place where a third user is present;
the processor supplies a message from the first user to the third user; and
the processor receives information indicative of a rating of the merchandise given by the third user as another message for the first user.

4. The self-propelled travelling apparatus according to claim 3, wherein the third user is a past purchaser of the merchandise.

5. The self-propelled travelling apparatus according to claim 1, further comprising a memory that stores, for the message associated with the merchandise, a correspondence between a supplier of the message associated with the merchandise and a receiver of the message associated with the merchandise.

6. The self-propelled travelling apparatus according to claim 5, wherein
in the correspondence, information indicative of a supplier of the merchandise or a receiver of the merchandise is associated with the supplier of the message associated with the merchandise and the receiver of the message associated with the merchandise.

7. The self-propelled travelling apparatus according to claim 5, wherein
the processor controls the self-propelled travelling apparatus to travel around along a predetermined route;
the processor receives the message associated with the merchandise for the second user from the first user and the message not associated with the merchandise for the first user from the second user while the self-propelled travelling apparatus is travelling around; and
in the correspondence, information indicates the number of a current round of travelling between the first user and the second user.

8. The self-propelled travelling apparatus according to claim 1, wherein the processor is further configured to:
in a case where the merchandise is placed by the first user in the merchandise storage space, prompt the first user to enter a message about an item corresponding to a kind of the merchandise.

9. The self-propelled travelling apparatus according to claim 1, wherein
the processor receives, as the message associated with the merchandise, a message according to a mode in which the second user receives the merchandise.

10. The self-propelled travelling apparatus according to claim 9, wherein
the processor receives, as the message according to the mode, a message given before the second user receives the merchandise and another message given after the second user receives the merchandise.

11. The self-propelled travelling apparatus according to claim 9, wherein
the processor receives, as the message according to the mode, a message corresponding to the number of pieces of the merchandise or a quantity of the merchandise received by the second user.

12. The self-propelled travelling apparatus according to claim 1, wherein the first user is a seller of the merchandise, and the second user is a current purchaser of the merchandise.

13. An information processing apparatus comprising:
a memory; and
a processor, configured to:
control travelling of a self-propelled travelling apparatus from a first place at which a first user placing a merchandise at the self-propelled travelling apparatus is present to a second place at which a second user is present;

during travelling of the self-propelled travelling apparatus, receive and store a message associated with the merchandise from the first user in the memory;

supply the message associated with the merchandise to the second user in a case where the second user receives the merchandise; and in a case where the merchandise and the message are supplied to the second user, receive a message not associated with the merchandise for the first user from the second user.

14. A non-transitory computer readable medium storing a program causing a computer to:

control travelling of a self-propelled travelling apparatus from a first place at which a first user placing a merchandise at the self-propelled travelling apparatus is present to a second place at which a second user is present;

receive a message associated with the merchandise from the first user during travelling of the self-propelled travelling apparatus;

supply the message associated with the merchandise the second user in a case where the second user receives the merchandise; and in a case where the merchandise and the message are supplied to the second user, receive a message not associated with the merchandise for the first user from the second user.

* * * * *